(12) United States Patent
Kowalski

(10) Patent No.: US 7,031,249 B2
(45) Date of Patent: Apr. 18, 2006

(54) OUTER CODE FOR CSMA SYSTEMS USING AN OFDM PHYSICAL LAYER IN CONTENTION-FREE MODE

(75) Inventor: John Michael Kowalski, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 439 days.

(21) Appl. No.: 09/800,449

(22) Filed: Mar. 5, 2001

(65) Prior Publication Data

US 2002/0167962 A1    Nov. 14, 2002

Related U.S. Application Data

(60) Provisional application No. 60/244,009, filed on Oct. 27, 2000.

(51) Int. Cl.
*H04L 12/413* (2006.01)
*H04J 11/00* (2006.01)
*G06F 11/08* (2006.01)

(52) U.S. Cl. .............. 370/203; 370/441; 370/445; 370/469; 370/479; 375/260; 375/346; 714/752; 714/776

(58) Field of Classification Search .......... 370/208, 370/210, 328, 329, 330, 338, 343, 445, 448, 370/203, 441, 469, 479; 375/260, 346; 714/752, 714/776
See application file for complete search history.

(56) References Cited

U.S. PATENT DOCUMENTS

| 4,811,361 | A | * | 3/1989 | Bacou et al. ............... 375/242 |
| 5,475,716 | A | | 12/1995 | Huang |
| 5,949,796 | A | | 9/1999 | Kumar |
| 6,192,026 | B1 | * | 2/2001 | Pollack et al. ............... 370/203 |
| 6,289,000 | B1 | * | 9/2001 | Yonge, III ................... 370/203 |
| 6,314,102 | B1 | * | 11/2001 | Czerwiec et al. ......... 370/395.6 |
| 6,671,284 | B1 | * | 12/2003 | Yonge et al. ............... 370/462 |
| 6,823,483 | B1 | * | 11/2004 | Creigh ........................ 714/701 |
| 6,907,044 | B1 | * | 6/2005 | Yonge et al. ............... 370/445 |

FOREIGN PATENT DOCUMENTS

| EP | 0 891 067 A2 | 1/1999 |
| EP | 0 944 179 A2 | 9/1999 |

OTHER PUBLICATIONS

International Standard CEI/IEC 61883-4, Consumer audio/video equipment digital interface, Part 4: MPEG2-TS data Transmission; First Edition, Feb. 1998.
ISO/IEC 8802:1999(E) IEEE Std 802.11, 1999 edition. International Standard Information Technology—Telecommunications and information exchange between systems—Local and metropolitan area networks—Specific Requirements—Part11: Wireless LAN Medium Access Control (MAC) and Physical Layer (PHY) specifications.

* cited by examiner

*Primary Examiner*—Alpus H. Hsu
(74) *Attorney, Agent, or Firm*—Robert D. Varitz, PC

(57) ABSTRACT

A coding scheme for use with a CSMA protocol to enable transmission of high data rate information signals thereover, wherein the protocol includes an OFDM physical layer, a MAC layer and a CSMA protocol inner code, includes providing an outer coding generator; generating outer code words containing coded and uncoded data therein in the outer code generator; wherein, the generated outer code words fit with a small multiple of data bits with an OFDM symbol having a fixed number of data bits, thereby providing for transmission of high data rate information using the outer code and the CSMA protocol inner code at a data rate of at least 24 Mbps and at a packet error rate of less than $1.5 \cdot 10^{-9}$.

23 Claims, 2 Drawing Sheets

| MAC Header | | | | MSDU or MMPDU | | | | | | |
|---|---|---|---|---|---|---|---|---|---|---|
| 24 or 28 | 2 | 0 or 4 | 6 or 12 FEC | 0-4 | 1 | k48 | k8 | | k48 | k8 |
| MAC Header | Virtual Stream ID | Security Field (Opt.) | (12 if Security Field Present | Security | FEC | MPDU$_1$ | FEC | . . . | MPDU$_j$ | FEC | . . . |

OUTER CODE FOR CSMA SYSTEMS USING AN OFDM PHYSICAL LAYER IN CONTENTION-FREE MODE

This application claim the benefit of Provisional application Ser. No. 60/244,009, filed Oct. 27, 2000.

FIELD OF THE INVENTION

This invention relates to the addition of an outer coding scheme for any carrier-sense multiple access (CSMA) based scheme that uses an orthogonal frequency division multiple access (OFDM) physical layer, such as 802.11a. In particular, it is applicable to some powerline systems being proposed in the HomePlug industry forum.

BACKGROUND OF THE INVENTION

The IEEE's standard for wireless LANs, designated IEEE 802.11, provides two different ways to configure a network: ad-hoc and infrastructure. In an ad-hoc network, computers form a network "on the fly," with each computer or 802.11 device joining the network as is able to send and receive signals. There is no defined structure in an ad-hoc network; there are no fixed points; and every node in the network is able to communicate with every other node in the network. Although it may seem that order would be difficult to maintain in this type of network, sufficient algorithms, such as the spokesman election algorithm (SEA), are provided and are designed to "elect" one machine as the base, or master, station of the network, with the others machines being "slaves." Another algorithm in ad-hoc network architectures uses a broadcast and flooding method to all other nodes to establish the identity of all nodes in the network.

The infrastructure architecture provides fixed network access points for communications with mobile nodes. These network access points (APs) are sometime connected to land lines to widen the LAN's capability by bridging wireless nodes to other wired nodes. If service areas overlap, hand-offs may occur between wireless LANs. This structure is very similar to that used in cellular networks.

IEEE 802.11 standard places specifications on the parameters of both the physical (PHY) and medium access control (MAC) layers of the network. The PHY layer, which actually handles the transmission of data between nodes, may use either direct sequence spread spectrum, frequency-hopping spread spectrum, or infrared (IR) pulse position modulation. IEEE 802.11 makes provisions for data rates of up to 11 Mbps, and requires operation in the 2.4–2.4835 GHz frequency band, in the case of spread-spectrum transmission, which is an unlicensed band for industrial, scientific, and medical (ISM) applications; and in the 300–428,000 GHz frequency band for IR transmission. Infrared is generally considered to be more secure to eavesdropping, because IR transmissions require absolute line-of-sight links, i.e., no transmission is possible outside any simply connected space or around corners, as opposed to radio frequency transmissions, which can penetrate walls and be intercepted by third parties unknowingly. However, infrared transmissions can be adversely affected by sunlight, and the spread-spectrum protocol of 802.11 does provide some rudimentary security for typical data transfers. Additionally, IEEE 802.11a allows for transmission in the 5 GHz UNII bands, 5.15 GHz to 5.25 GHz and 5.25 GHz to 5.356 GHz, at data rates up to 54 Mbps.

The MAC layer includes a set of protocols which is responsible for maintaining order in the use of a shared medium. The 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor," which determines the amount of time the node must wait until it is allowed to transmit its packet. During periods in which the channel is clear, the transmitting node decrements its backoff counter. When the channel is busy it does not decrement its backoff counter. When the backoff counter reaches zero, the node transmits the packet. Because the probability that two nodes will choose the same backoff factor is small, collisions between packets are minimized. Collision detection, as is employed in Ethernet®, cannot be used for the radio frequency transmissions of IEEE 802.11, because when a node is transmitting, it cannot hear any other node in the system which may be transmitting, because its own signal will block any other signals arriving at the node. Whenever a packet is to be transmitted, the transmitting node first sends out a short ready-to-send (RTS) packet containing information on the length of the packet. If the receiving node hears the RTS, it responds with a short clear-to-send (CTS) packet. After this exchange, the transmitting node sends its packet. When the packet is received successfully, as determined by a cyclic redundancy check (CRC), the receiving node transmits an acknowledgment (ACK) packet. This back-and-forth exchange is necessary to avoid the "hidden node" problem, i.e., node A can communicate with node B, and node B can communicate with node C. However, node A cannot communicate node C. Thus, for instance, although node A may sense the channel to be clear, node C may in fact be transmitting to node B. The protocol described above alerts node A that node B is busy, and requires node A to wait before transmitting its packet.

Although 802.11 provides a reliable means of wireless data transfer, some improvements to it have been proposed. The use of wireless LANs is expected to increase dramatically in the future as businesses discover the enhanced productivity and the increased mobility that wireless communications can provide.

The IEEE Standard P802.11a, July, 1999 (Supplement to IEEE Std. 802.11-1999), provides background for this invention. Referring to FIG. 1, the 802.11a PHY layer transmit chain is depicted generally at 10. Chain 10 includes a convolution encoder 12, and interleaver/construction mapper 14, an OFDM modulator 16, a symbol shaper 18, an unconverter/transmitter 20, and an antenna 22. Currently, 802.11a uses only convolutional encoder 12 to provide forward error correction (FEC). The Quality of Service (QoS) prior art for IEEE 802.11a uses the automated response query (ARQ) mechanism, which imposes longer delay and jitter, and can impede the enforcement of QoS policies. These QoS enhancements will enable the transmission of high quality video, e.g., MPEG2, which requires data rates up to 24 Mbps. However, for consumer audio-video equipment, and particularly for interactive applications, such as remote control of high-quality audio-video, both high bandwidth and low latency transmission are required. Thus, these applications demand a minimal use of the ARQ mechanisms. One solution to this problem is to provided FEC, or in the case of 802.11a, additional FEC. International Standard CEI/IEC 61883-4, Consumer audio/video equipment digital interface, Part 4: MPEG2-TS data Transmission; First Edition, February 1998.

There is additional FEC proposed for 802.11b in the *Joint Proposal for QoS Enhancements*, Submitted by AT&T, Sharewave, Lucent, et al., presented Sep. 18, 2000 in IEEE 802.11, and listed as document number 802.11-00/120r1 to IEEE 802.11-1999 standard, however, because its modulation scheme is different from the basic scheme of 802.11, and because its data rates are lower, the Joint Proposal scheme, if used in 802.11a, will impose significant reductions in channel efficiency due to having to transmit parity data for a large payload when oftentimes there is a small payload, such as is the case with many management frames. In the Joint Proposal to 802.11e, additional coding is proposed for high quality transmission. While such a coding scheme was envisaged for 802.11b, that coding scheme is not adequate to work with the 802.11a physical layer requirements.

The use of an outer code in a wireless communication system to provide additional FEC has been proposed in Lin and Costello, *Error Control Coding: Fundamentals and Applications*, Prentice-Hall, 1983, and in R. McEliece, *The Theory of Information and Coding*, Addison-Wesley, 1977. However, because of the legacy of 802.11 as an ARQ based system, there is little prior art in this field except for the block coding scheme of the Joint Proposal, which that code is for a complementary code keying/packet binary code keying (CCK/PBCK) modulation system, which has interframe spacing different from that of 802.11a. A different coding methodology is required for 802.11a, which codes data in multiples of 24 data symbols. The proposed CCK/PBCK coding methodology is not applicable to 802.11a, or other CSMA/OFDM wireless networks.

In the IEEE 802.11a standard (1999), the channel link is designed, for various received signal levels, to maintain a 90% packet throughput in the absence of collisions. If a packet is successfully received, an ACK is sent to the sending station (STA). If an ACK is not received, after a suitable time, the packet is re-sent. The loss of packets in 802.11 systems adds considerable latency to the system, as well as jitter, i.e., the packet delivery can vary with time.

Moreover, it is desirable to be able to transmit high quality AV over 802.11a, one of two competing 5 GHz wireless LAN technologies, the other being HiperLAN 2, in the home network. A wireless home network, combined with device discovery features, will enable the home network user to rapidly deploy his network with a minimum of effort. Because of the anticipated earlier market introduction of 802.11a systems, 802.11a is a leading, if not the leading, candidate for home network deployment in the 5 GHz band. However, in order for 802.11a to be successful in this market area, a reliable, low jitter, low latency mode is needed, which mode is not currently provided in the standard. A goal of the invention is to provide less than one frame error in 10 hours of transmission, with at most, one packet retry, assuming the link conditions are met for 802.11a.

U.S. Pat. No. 5,949,796 to Kumar, granted Sep. 7, 1999, for In-band on-channel digital broadcasting method and system, describes an in-band, on-channel digital signal for FM RF broadcasts.

U.S. Pat. No. 5,475,716, granted Dec. 12, 1995, to Huang, for Method for communicating block coded digital data with associated synchronization/control data, describes blocked coded digital data transmission, but does not describe a CSMA transmission using an OFDM PHY.

SUMMARY OF THE INVENTION

A coding scheme for use with a CSMA protocol to enable transmission of high data rate information signals thereover, wherein the protocol includes an OFDM physical layer, a MAC layer and a CSMA protocol inner code, includes providing an outer coding generator; generating outer code words containing coded and uncoded data therein in the outer code generator; wherein, the generated outer code words fit with a small multiple of data bits with an OFDM symbol having a fixed number of data bits, thereby providing fro transmission of high data rate information using the outer code and the CSMA protocol inner code at a data rate of at least 24 Mbps and at a packet error rate of less than $1.5 \cdot 10^{-9}$.

An object of the invention is to provide a minimal increase in interframe spacings specified for 802.11a and other CSMA systems, while maintaining minimum latency.

Another object of the invention is to provide early detection of failed packets.

A further object of the invention is to provide a modification to 802.11a which fits within the framework of currently proposed Quality of Service enhancements for 802.11.

Another object of the invention is to provide a coding scheme suited for use with MPEG transport streams.

Yet another object of the invention is to provide a coding scheme for integration into 802.11a and 802.11e packet formatting which allows non-FEC capable devices to read FEC coded packets.

Another object of the invention is to provide less than one frame error in 10 hours of transmission.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 2 depicts an exemplar of a frame format of an outer word of the invention.

DETAILED DESCRIPTION OF THE PREFERRED EMBODIMENT

Figure 1:
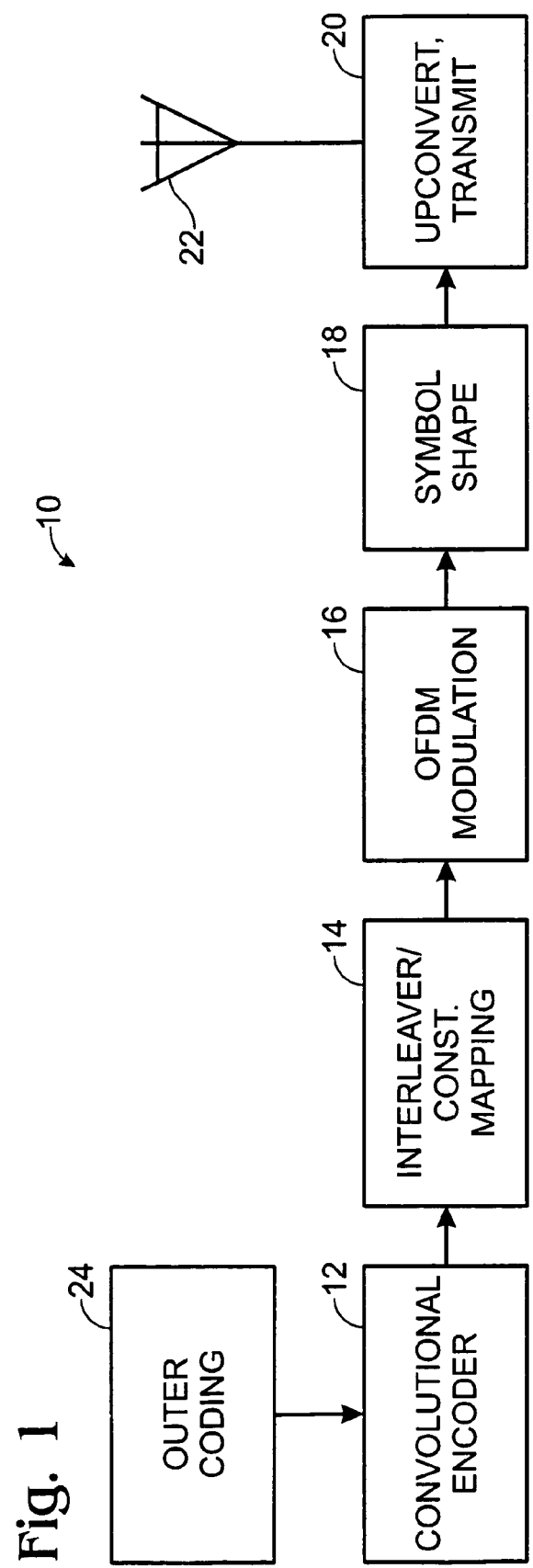
FIG. 1 depicts 802.11a physical layer (PHY) transmit chain modified by the invention.

The use of an outer code, with error correcting requirements described herein, will enable wireless video transmission with less than 1 frame error in 10 hours due to an error in the MAC protocol data unit, with up to one retry allowed, provided that the contention free mode of 802.11 is used, and yet still not significantly impact channel efficiency. Thus, this invention can enable the use of 802.11a for high quality transmission of audio-visual (AV) signals, such as MPEG-2, as well as other applications, in a uniform manner. It can also provide enterprise networks with "near wireline" equivalent transmission.

The problem of reliable transmission of wireless audio-video (AV) signals, and other data, is solved in a uniform way in a Collision Sense Multiple Access (CSMA) based wireless LAN systems when an Orthogonal Frequency Division Multiple Access (OFDM) Physical Layer (PHY) is employed, via the use of an additional code. The use of an additional encoding prior to the convolutional code, also known as a "outer code," generated by an outer coding generator, 24 in FIG. 1, which is preferably deployed in either the MAC or PHY, is used to rectify these problems.

The invention differs from the known prior art in (1) the use of an outer coding scheme for the 802.11a PHY, which is consistent with 802.11 MAC parameters, particularly interframe spacing parameters, that produces minimal additional overhead, while meeting requirements for a very low packet loss rate; and (2) the use of a frame format which enables decoding to be done on subsets of the payload, to enable speedy frame transmission, reduce jitter, and to enable aggregated packets to be sent to higher layers separately, assuming separate frame check sums are present on each segment.

Although the preferred embodiment of the invention uses Reed-Solomon (RS) Codes, any systematic code, i.e., a code where code words include uncoded data, block coding scheme that corrects at least two errors in twelve four-bit data symbols, or three errors in twenty-six eight-bit symbols is applicable. Based in the above, in particular, codes which correct eight eight-bit symbols in 239 symbols or less, as obtained through the use of a 255,239 code, may be an (n, k) code, where n symbols are coded and k symbols are uncoded. Nonsystematic codes may also be used, however, they do not provide separate data and "parity" fields, and thus do not prevent non-FEC capable stations, or devices, from reading the uncoded data.

For other non 802.11a CSMA/OFDM systems, the use of an outer block code wherein (1) the code words and the uncoded data are such that they fit with a "small", i.e., less than 20, with respect to interframe spacing, multiple of data bits contained within an OFDM symbol which contains a fixed number of data bits; and (2) the code, combined with an inner code, provides for packet error rates less than $1.5 \cdot 10^{-9}$, may accomplish the same functionality as for 802.11a systems.

Several embodiments of the invention, using Reed-Solomon codes, are described herein, however, for 802.11a OFDM PHYs, and for other CSMA/OFDM networks, any outer block code wherein (1) the code words and the uncoded data fit with a "small" multiple of data bits contained within an OFDM symbol which contains a fixed number of data bits; (2) the code, combined with an inner code, provides for packet error rates less than $1.5 \cdot 10^{-9}$; and (3) the use of different block codes for shorter and longer payloads, so as to minimize overhead; will work successfully. This invention describes the use and structure of additional coding necessary for premium services over 802.11 systems, with special attention to 802.11a and 802.11e. However, the coding scheme of the invention is applicable to 802.11b and higher rate PHYs, which are presently being developed.

Turning initially to the IEEE 802.11a standard, a need for additional coding for high quality, high data rate information, such as AV applications, is required. Various alternative approaches as to where this coding may be performed are described. While a long term solution may favor an extension to current high rate PHY standards, in the short term, additional coding in the MAC may be adequate. The question of whether or not coding can be done at higher layers depends on the various packet correction/retransmission mechanisms that exist in the 802.11e MAC.

Problem Definition

It is desired to have a very low error rate for 5 GHz traffic, particularly for HDTV and high rate MPEG video. As previously discussed, enabling these features in a way that yields near-wireline performance will greatly expand the market for 802.11 technology, e.g., at 30 fps, and 24 Mbps, (HDTV/1394 rates) an error rate of one frame or less in every ten hours is desirable. Although some frames in MPEG/DVD streams, namely I-frames, convey more information and are more sensitive to error degradation than the B and P frames, these frames will be assumed to be of minimal impact in this invention.

802.11a requires, for packet sizes of 1000 bytes, an error rate of 0.1 packets lost. However, in order to cope with an error rate approaching wireline quality, an error rate of $<1.5 \cdot 10^{-9}$ is required.

TABLE 1

Parameters relevant to the coding problem for the current implementations of 802.11a.

| | |
|---|---|
| Data Rate, Mbps | 24 |
| Frames per second | 30 |
| Packet Rate per second at 1000 bytes/packet | 24000 |
| Total Number of error-free hours | 10 |
| Number of packets/hour | 86400000 |
| Packet Error rate desired | $1.15741 \cdot 10^{-9}$ |
| BER of Present 802.11 a PHY | $1.313 \cdot 10^{-5}$ |

The desired error rate may be maintained with nine packet retries; that is, with at least nine packet retries, the probability of successful packet delivery is greater than $1 \cdot 10^{-9}$. This is shown by considering the following sum, which gives the probability that a packet is successfully presented to higher layers after i>0 retries:

$$P_i = \sum_{n=0}^{i} p_0(1-p_0)^n \qquad (1)$$

where $p_0=1-P[\text{lost frame}]$. Eq. (1), for the required packet error rate, conveniently adds a "9" into the (n+1)th decimal place for each sum.

This delay can lead to excessively long buffer sizes/jitter values when MPEG-2 video is to be transmitted. Furthermore, it is wasteful of bandwidth. Therefore, with the present 802.11 system, it is not feasible to transmit high rate video, given identical receiver sensitivities, and the same PHY as presently used in 802.11a. The use of additional coding schemes must therefore be considered.

Where to put the Coding

IEEE 802.11-00/071 discusses the use of an FEC option for protecting MAC headers, with additional FEC provided separately for the MAC service data unit (MSDU). An objection may be raised to this proposal that an outer code more appropriately belongs in the MAC. However, for the applications intended for use with the method of the invention, the coding may as well be performed in either the MAC or PHY, with a caveat that if no additional coding is performed on the Physical Layer Convergence Protocol (PLCP) header, the signal excesses which virtually guarantee PLCP header decoding at higher rates will not be present at lower rates. The PLCP header is that portion of the packet which, in the PHY, is used to determine the transmitted rate and packet length. It is always transmitted first, and at the lowest data rate, which is 6 Mbps, except for the data scrambling portion of the header. The scrambler portion of the header limits the error rate of the packet, and can be set to an initial value via, e.g., management frames.

It should be noted that the performance for coding schemes recommended here are given for the enhanced contention free point coordination function (PCF), that is, these schemes are currently intended for the contention free mode, i.e., the analysis assumes no collisions. While it is true that performance advantages will accrue for the distributed coordination function (DCF) with additional coding schemes without collisions, the effect of collisions in the DCF and its impact on performance using an outer code are not analyzed herein. Because of the contentious nature of the DCF mode, any possible enhancement in protecting against collisions will require stronger, i.e., longer block length, codes than the shorter ones described herein.

In 802.11a, the bit error rate that yields a forward error rate (FER) of 0.1, from Table 1, is $1.313 \cdot 10^{-5}$. This is computed by assuming that at least one bit in a payload of 8000 bits plus the 24 bit header causes a frame error. Assuming that as a backward error rate (BER), PLCP header failures will occur with probability $3.15 \cdot 10^{-4}$ (=1-(1-P[PLCP header bit in error])$^{24}$, because there are 24 bits in the header, ignoring the SERVICE field, which at present is used only to synchronize the descrambler for the payload and conveys no information. Using similar reasoning, one can show that up to three retries are required in order to successfully receive the PLCP header and meet the packet error rate requirement of Table 1.

Typically, the number of retries in a current 802.11 system is kept to between about three to fifty; with overhead, for the above system, that corresponds to a delay of 333 μs/retry. If latency is to be minimized and performance guaranteed for highly reliable data transfer, some form of error protection for the PLCP header beyond that which is currently used in 802.11a is required when there is not sufficient signal excess. This is the case when the system is operating at 6 Mbps, near the minimum receiver sensitivity. However, because the specification allows for higher received signal levels at higher rates, this will not be a problem, except for the scrambler "initialization," which may be established via management signalling. If the system is guaranteed to operate with the above packet failure rates at 54 Mbps, than the PLCP header failure probability is approximately $10^{-17}$, from extrapolation of curves for probability of error of K=7, rate 1/2 convolutional codes.

At a minimum, coding for those scenarios in which highly reliable high data throughput is required and for which PLCP header error is insignificant with respect to impacting the error rates must be specified. This implies a one-try packet header failure rate of the order of $10^{-11}$ or less. Using similar reasoning as above, one can show that there is sufficient signal excess to guarantee this, except at 6 Mbps.

In summary, except for 6 Mpbs, there is sufficient signal excess to guarantee a negligible contribution to FER due to packet header errors; and high bandwidth, very low error rate applications will generally require more than 6 Mbps bandwidth anyway.

Some video coding standards, such as H.260, ITU J standards, specify optional coding schemes. Additionally, application layers implement rate adaptation, error resiliency, and error concealment. However, these schemes are not uniform, and a given coder may or may not have coding built in. Thus, for maximum flexibility, it would be desirable to have additional coding at the MAC or PHY. Furthermore, because QoS mechanisms should effect controls where they are needed—and 802.11a, at this time, is far from wireline quality in behavior—an outer coding option provides uniform transmission quality to applications.

There is an issue of channel efficiency. Outer coding schemes, when applied to 802.11a, may rely upon re-transmission of error-containing frames, which, in 802.11, is typically acknowledged. If an acknowledged mode is supported, as in 802.11, some means of ensuring highly reliable transmission of acknowledgements is required as well.

Alternatives for outer coding locations are given in Table 2.

TABLE 2

| Where | Advantages | Disadvantages |
|---|---|---|
| PHY | 1. Allows PLCP header protection at 6 Mbps. 2. Guarantees error rate independent of application, 3. Frame check sequence (FCS) can be done on outer code decoded payload, increasing reliability, | 1. Would require a new PAR, and its attendant time, jeopardizing time to market, and impacting hardware already in development. 2. Code may pose limits on protocol data unit (PDU) size since a code of a minimum length may have to be specified to meet error correction/burst error robustness requirements. 3. Coding delay may potentially affect 802.11 parameter settings-e.g., PIFS, DIFS, etc. |
| MAC | 1. Provides protection of payload, and allows for less communication to higher layers (because bad frames aren't sent up). 2. Guarantees error rate independent of application, 3. FCS can be done on outer code decoded payload, increasing reliability. | 1. Does not protect PLCP header at 6 Mbps. 2. Code may pose additional constraints on PDU size. 3. Coding delay may potentially affect 802.11 parameter settings-e.g., PIFS, DIFS, etc. |
| Higher Layers | 1. Simplifies the MAC and PHY. 2. Reduces time to develop a standard. | 1. Requires possibly FCS failed packets to be passed up to higher layers. 2. Would involve additional retransmit/fragmentation delays, since at present, the standard does not support sending error-containing frames to higher layers. 3. Does not protect PLCP header. 4. Does not provide a unified, application independent solution to low error rate communication over 802.11 |

Thus, either the MAC or PHY is appropriate for high data rate transfer FEC. Relying solely upon the application will not only increase delay, it will cause performance to vary from application to application; however, coding for the MAC, as per the Joint Proposal, seems to be the preferred alternative.

Coding Requirements

If the above FER of $1.1574 \cdot 10^{-9}$ is to be maintained, for a 1000 byte payload, a BER of $1.25 \cdot 10^{-13}$ is required, if no retries are considered. As a practical matter, of course, for CSMA systems, retries are allowed. If one retry is allowed, the required raw FER becomes $3.56 \cdot 10^{-7}$. In either case, outer coding can help reduce this rate. In 802.11a, in order to meet the short interframe spacing time (SIFS) of 16 μsec, required to differentiate transmitted packets in a time, and RxTx turnaround time of 2 μsec, which is required for the receiver to complete a reception of a packet settle internal transients, and prepare to transmit a MAC-level FEC, the system must operate with either a delayed acknowledgement, or no acknowledgement of reception.

The outer code is a block code, capable of correcting up to t symbols of m bits per symbol in a block length of $N_1$ symbols. The packet is composed of $N_2$ symbols, and, to make the computations easier, and also posing a constraint on the packet length for high quality transmission, the packet length of N bits is partitioned into $N/N_1$ blocks. This constraint however, is not unreasonable for streaming transmission.

Assuming the outputs of the convolution decoder for 802.11a, or the equalizer outputs for 802.11b, are independent and identically distributed (iid), which is true provided the STA is operating at or above the signal-to-noise ratio required for a 10% packet error rate (PER); then, P[block error]=P is given by:

$$P = \sum_{k=mt+1}^{N} \binom{N}{k} p_e^k (1-p_e)^{N-k} + \sum_{s=t+1}^{mt} \left[ \binom{N}{k} - \sum_{k=t-h}^{t} \binom{mk}{s} \binom{N_2}{K} \right] p_e^s (1-p_e)^{N-s} \quad (2)$$

where h=—(ceiling(s/m)−t); i.e., h is such that the second summation index s can be written as s=m(t−h)−r, where 0<r<m−1, $p_e$ is the packet error rate, t is the number of error bits which the code is capable of correcting, and k is the number of information bits.

In particular, Reed-Solomon (RS) codes are capable of achieving the above coding properties. As an example, consider the use of RS(204, 188), which is capable of correcting up to eight symbol errors, where m=8, for block lengths of 188 bytes. In that case, the probability of a block error can be bounded by:

$$P < \sum_{k=t+1}^{N} \binom{N}{k} p_e^k (1-p_e)^{N-k} = 1.18 \cdot 10^{-21}. \quad (3)$$

For such a code therefore, for a packet length of 5*188 bits, the packet error rate is $5.9 \cdot 10^{-21}$.

There are many codes which may be used to obtain the required performance besides the RS codes mentioned above, however, because RS codes are well known to be able to maintain a relatively high rate and correct errors, they are preferred. RS codes also have desirable low latency properties.

For 802.11 OFDM, it is highly desirable that the number of coding symbols fit within an integral number of OFDM symbols. This requires that the rate of the code be a multiple of 24, because, in the original 802.11 MAC, timing synchronizaiton is assumed to be within 2 μs.

If a code is not an integral multiple of 24, a code that fits at least within the traceback length of the convolution decoder can also be used. One code which meets the latter criterion is a (n=31, k=25, t=3) code, where n is the number of coded bits, k=the number of information bits, and t=the number of erorred bits the code is capable of correcting. In this case, using an analysis similar to that presented above, the probability of error within 25 information bits is $4.25 \cdot 10^{-16}$, and the probability of an errored 1000 byte packet is $1.09 \cdot 10^{-13}$. The overhead for this code is approximately 25%. This code can also be extended by appending an information bit to the code to produce a RS code of (n=32, k=26, t=3), which fits in an inetegral multiple of 96 symbols.

Another possibility is a Reed-Solomon code where (n=16, k=12, t=2); which code provides a frame error rate of $6.44 \cdot 10^{-10}$ for a 1000 byte packet. This code is constructed by taking the (n=15, k=11 t=2) RS code and appending an information bit. This code has the advantage, that for rates in the 802.11a standard greater than or equal to 12 Mbps, it fits within a multiple of OFDM symbols. Thus either a (n=31, k=25, t=3), a (n=32, k=26, t=3), or a (n=16M, k=12M, t=2M) code, where M is a constant greater than 1, may be used.

An additional advantage of such codes is that they produce the required frame error rates, and yet do not produce a great increase in latency, which is required in order to have high channel efficiency for a CSMA, system such as 802.11 CSMA systems. This is because signals in a CSMA system provide a "guard time" between packets, also known as frames, sent to reduce the likelihood of collision, due to possible timing errors in contention free modes of thse multiple access sytems. It is desirable to make this guard time, or interframe spacing, as short as possible to maximize channel efficiency. This is achieved by the codes for the point coordination function in 802.11a, or other OFDM systems, where the interframe spacing is shortened for the contention free mode relative to the contention mode.

To minimize overhead, it may be desirable, assuming computational complexity is minimized, to use a combination of Reed-Solomon codes. For frames less than B bytes, either a (n=32, k=26, t=3), or a (n=M16, k=M12, t=2M) code may be used; for frames greater than B bytes, a (255, 239, t=8) or a (204, 188, t=8) code may be used. Here, B is either an administrated parameter, a parameter set in the mangement information base (MIB) of the network, or, simply assigned to certain classes of frames which are known always to be less than B bytes. This scheme is particularly attractive because frames, such as ACKs, association requests, and other managment frames, tend to be small relative to AV frames.

Frame Format

Because Reed-Solomon codes can be implemented as systematic codes, they can be represented using separate data and "parity" fields. A code that intersperses frame and parity check fields is used. This has two advantages: (1) it allows for early discovery of bad packets, if a bad part of a packet is discovered early; and (2) it allows for early decoding of payload information, which can help reduce overall buffer jitter.

One form of the proposed packet format is illustrated in Table 3, which includes separate coding for the MAC header and for the frame body, wherein the middle row indicates the number of bytes in each field in the frame format:

TABLE 3

| MAC Header | | | | | | | | | | |
|---|---|---|---|---|---|---|---|---|---|---|
| | | | | 6 or 12 | | | MSDU or MMPDU | | | |
| 24 or 28 | 2 | 0 or 4 | FEC | 0–4 | 1 | k48 | k8 | | k48 | k8 |
| MAC header | Virtual Stream ID | Security Field (Opt.) | (12 if Security field present) | Secuity | FEC | $MPDU_1$ | FEC | . . . | $MPDU_j$ | FEC . . . |

This format utilizes the (16,12) Reed-Solomon code. It also modifies the current Joint Proposal in that the security fields are moved to the front of the packet, so that in cases where it is feasible to initialize decryption before packet reception is complete, such initialization may be performed. $MPDU_j$ denotes the $j^{th}$ 48 byte multiple segment of payload. Here, k is a constant greater than one. If payload sizes do not fit in an integral multiple of 48 bytes, padding of zeroes is assumed at the transmitter, and reconstructed at the receiver. Note that the maximum 2304 byte payload is reduced accordingly. This structure allows the MAC header to be separately protected and the MSDU or MMPDU to be protected by systemic code. The structure also allows a device or STA to ignore the fields and instantiate decoding via management frames. The uncoded data portion may be used for transmitting MPEG2, and future MPEG, transports streams. Further, the packet formatting provided FEC, or enhanced FEC, but still allows legacy, non-FEC capable devices to decode the packets.

Thus, a method for providing an outer coding scheme has been disclosed. It will be appreciated that further variations and modifications thereof may be made within the scope of the invention as defined in the appended claims.

I claim:

1. A coding scheme for use with a CSMA protocol to enable transmission of high data rate information signals thereover between devices, wherein the protocol includes an OFDM physical layer, a MAC layer, a CSMA protocol inner code and a systemic code, comprising:
   providing an outer coding generator;
   generating outer code words containing coded and uncoded data therein in the outer code generator;
   wherein, the generated outer code words fit with a small multiple of data bits with an OFDM symbol having a fixed number of data bits, thereby providing for transmission of high data rate information using the outer code and the CSMA protocol inner code at a data rate of at least 24 Mbps and at a packet error rate of less than $1.5 \cdot 10^{-9}$.

2. The coding scheme of claim 1 wherein said generating outer code words includes generating outer code words of different lengths as a function of the data being transmitted.

3. The coding scheme of claim 1 wherein said generating outer code words includes generating outer code words in multiples of 24.

4. The coding scheme of claim 1 wherein said generating outer code words includes generating separate header coding and parity check symbols and separate frame body coding.

5. The coding scheme of claim 1 wherein said generating outer code words includes generating outer coding words operable with MPEG transport streams.

6. The coding scheme of claim 5 wherein said generating outer code words includes generating an uncoded data portion for transmitting the MPEG transport stream.

7. The coding scheme of claim 1 which includes a management frame and wherein said generating outer code words includes generating a systemic code portion for use by a device wherein the device ignores code fields and instantiates decoding from management frames.

8. The coding scheme of claim 1 wherein said generating outer code words includes formatting packets in outer coding words with forward error correction, wherein packets are decodable by non-forward error correcting device.

9. A coding scheme for use with a CSMA protocol to enable transmission of high data rate information signals thereover between devices, wherein the protocol includes an OFDM physical layer, a MAC layer, a CSMA protocol inner code and a systemic code, comprising:
   an outer coding generator;
   outer code words containing coded and uncoded data therein in the outer code generator, including an uncoded data portion for transmitting the MPEG transport stream;
   wherein, said outer code words fit with a small multiple of data bits with an OFDM symbol having a fixed number of data bits, thereby providing for transmission of high data rate information using the outer code and the CSMA protocol inner code at a data rate of at least 24 Mbps and at a packet error rate of less than $1.5 \cdot 10^{-9}$.

10. The coding scheme of claim 9 wherein said outer code words are of different lengths as a function of the data being transmitted.

11. The coding scheme of claim 9 wherein said outer code word includes a separate header code and a separate frame body code.

12. The coding scheme of claim 9 which includes a management frame and wherein said outer code word includes a systemic code portion for use by a device wherein the device ignores code fields and instantiates decoding from management frames.

13. The coding scheme of claim 9 wherein said outer code word includes packet formatting with forward error correction, wherein said packet formatting are decodable by non-forward error correcting device.

14. The coding scheme of claim 9 wherein each coded word includes multiple coded fields, and wherein each coded field is decoded sequentially, and decoding stops on detection of an uncorrectable error, and the packet is discarded.

15. The coding scheme of claim 9 wherein a short interframe spacing time is present between frames having coded words therein, and wherein the acknowledgement policy is deferred in time for a period at least two-times that of the SIFS time.

16. A coding scheme for use with a CSMA protocol to enable transmission of high data rate information signals thereover between devices, wherein the protocol includes an OFDM physical layer, a MAC layer, a CSMA protocol inner code and a systemic code, comprising:

providing an outer coding generator;

generating outer code words containing coded and uncoded data therein in the outer code generator, including formatting packets in the outer coding words with forward error correction, wherein packets are decodable by non-forward error correcting device;

wherein, the generated outer code words fit with a small multiple of data bits with an OFDM symbol having a fixed number of data bits, thereby providing for transmission of high data rate information using the outer code and the CSMA protocol inner code at a data rate of at least 24 Mbps and at a packet error rate of less than $1.5 \cdot 10^{-9}$.

17. The coding scheme of claim 16 wherein said generating outer code words includes generating outer code words of different lengths as a function of the data being transmitted.

18. The coding scheme of claim 16 wherein said generating outer code words includes generating separate header coding and parity check symbols and separate frame body coding.

19. The coding scheme of claim 16 wherein said generating outer code words includes generating outer coding words operable with MPEG transport streams.

20. The coding scheme of claim 19 wherein said generating outer code words includes generating an uncoded data portion for transmitting the MPEG transport stream.

21. The coding scheme of claim 16 which includes a management frame and wherein said generating outer code words includes generating a systemic code portion for use by a device wherein the device ignores code fields and instantiates decoding from management frames.

22. The coding scheme of claim 16 wherein each coded word includes multiple coded fields, and wherein each coded field is decoded sequentially, and decoding stops on detection of an uncorrectable error, and the packet is discarded.

23. The coding scheme of claim 16 wherein a short interframe spacing time is present between frames having coded words therein, and wherein the acknowledgement policy is deferred in time for a period at least two-times that of the SIFS time.

\* \* \* \* \*

UNITED STATES PATENT AND TRADEMARK OFFICE
CERTIFICATE OF CORRECTION

PATENT NO.         : 7,031,249 B2
APPLICATION NO. : 09/800449
DATED              : April 18, 2006
INVENTOR(S)        : John Michael Kowalski It is certified that error appears in the above-identified patent and that said Letters Patent is hereby corrected as shown below:

In column 9, lines 19-29, Equation (2) should read:

$$P = \sum_{k=mt+1}^{N} \binom{N}{k} p_e^k (1-p_e)^{N-k} + \sum_{s=t+1}^{mt} \left[ \binom{N}{s} - \sum_{k=t-h}^{t} \binom{mk}{s}\binom{N_2}{K} \right] p_e^s (1-p_e)^{N-s}$$

Signed and Sealed this

Twenty-sixth Day of September, 2006

JON W. DUDAS
*Director of the United States Patent and Trademark Office*